United States Patent [19]

Pan

[11] 3,989,466
[45] Nov. 2, 1976

[54] LIQUID-LIQUID EXTRACTION APPARATUS INCLUDING FIBROUS STRAND PACKING

[76] Inventor: Samuel C. Pan, 28 Beacon Hill Drive, Metuchen, N.J. 08840

[22] Filed: Aug. 13, 1973

[21] Appl. No.: 388,045

[52] U.S. Cl. ............................ 23/267 R; 23/267 A; 23/267 B; 23/267 E; 23/267 F; 23/270 R; 23/270.5 R; 23/272 R; 23/272.5; 23/272.6 R; 23/272.65; 210/21; 210/24; 210/201; 210/203; 260/154; 260/206; 260/208; 260/239.1; 260/256; 260/295 AM; 260/397.25; 260/488 F; 260/621 B
[51] Int. Cl.$^2$ .................. B01D 11/00; B01D 15/02; B01D 59/22
[58] Field of Search .......... 23/267 R, 267 A, 267 B, 23/267 E, 267 F, 270.5, 272.6 R, 272.6 S, 272.5, 270 R; 210/21, 24, 201, 203; 260/208

[56] References Cited
UNITED STATES PATENTS

| | | | |
|---|---|---|---|
| 2,054,809 | 9/1936 | Fleisher | 261/112 |
| 2,091,917 | 8/1937 | Fenske et al. | 23/267 R X |
| 2,427,578 | 6/1949 | Ferris et al. | 23/267 R |
| 2,808,318 | 10/1957 | Feick | 23/267.3 |
| 3,177,196 | 4/1965 | Scheibel | 23/267 R |
| 3,244,763 | 4/1966 | Cahn | 260/677 R |
| 3,496,996 | 2/1970 | Osdor | 165/111 |
| 3,585,005 | 6/1971 | Coggan | 23/267 R |
| 3,736,101 | 5/1973 | Pirtle | 23/267 MS |
| 3,758,404 | 9/1973 | Clonts | 208/263 |

OTHER PUBLICATIONS

Hou et al., Chemical Abstracts, vol. 43, 2042d (1949).

Menard et al., Chemical Abstracts, vol. 38, 897 to 898 (1944).

*Primary Examiner*—Floyd D. Higel
*Attorney, Agent, or Firm*—Burton Rodney

[57] ABSTRACT

Apparatus is provided for use in carrying out liquid-liquid extraction techniques, which apparatus includes an extraction column containing a unique solvent sorbing packing material, namely a plurality or bundle of elongated fibrous strands having first and second end portions, the strands being capable of sorbing a desired solvent; the apparatus also includes a separation zone in communication with the second end of the plurality of fibrous strands, means for feeding a first or heavy solvent phase through the bundle of fibrous strands so as to be sorbed by said strands, and subsequently into the separation zone, means for feeding a second or light solvent phase into the separation zone and thence through the annular spaces of the column, around the fibrous strands contained therein, means for recovering the light solvent phase from the first end of said bundle and means for recovering said heavy solvent phase from said separation zone. Apparatus for separating two components by extraction techniques is also provided wherein the fibrous strand packing is utilized. A process is also provided for carrying out a continuous liquid-liquid countercurrent extraction employing two continuous phases. The process is carried out employing apparatus as described above.

7 Claims, 2 Drawing Figures

LIQUID-LIQUID EXTRACTION APPARATUS INCLUDING FIBROUS STRAND PACKING

FIELD OF THE INVENTION

The present invention relates to apparatus for use in carrying out solvent extraction techniques which apparatus includes a packing material comprised of a plurality of elongated fibrous strands, and to a solvent extraction process employing such apparatus.

BACKGROUND OF THE INVENTION

Countercurrent liquid-liquid extraction techniques in which one material is transferred from one solution to another by countercurrent contacting of the two liquid phases has long been used as a laboratory and industrial process. A variety of liquid-liquid contacting apparatus have been proposed for the purpose of carrying out such extraction techniques. For the most part, such apparatus is designed to have the contact area, time of contact and the intimacy of contact between the solutions as high as possible with the expenditure of a minimum amount of energy. In order to achieve the requisite high contact area and intimacy of contact, conventional extraction columns have been filled with foreign objects of practically every reasonable size and shape such as, metal rings, rods, saddles, glass rings, Raschig rings, porcelain rings, Berl saddles, wire mesh packing, and the like. Other types of packing or contact elements are disclosed in U.S. Pat. No. 3,585,005 to Coggan.

The Coggan patent relates to a liquid-liquid contactor which comprises a hollow member through which in operation immiscible or partially miscible fluid phases are arranged to flow. Within the hollow member, at least one surface is preferentially wetted by one of the phases and is so arranged that substantially all of that phase during passage through the contactor flows on the surface in the form of a film. The hollow member is actually a column which may include as contact elements a number of vertically-arranged plates made alternately of glass and PTFE coated stainless steel. The plates are generally flat plates which may include baffles, containing holes. Alternatively, the flat plates may be replaced by a series of concentric tubes of increasing diameter or a plurality of spaced apart parallel rods. All of these contact elements are solid in nature and are not designed to sorb the solutions flowing by or through these elements.

U.S. Pat. No. 2,472,578 to Ferris et al discloses a method of contacting a liquid with a gas or with other immiscible or partially immiscible liquids. It is indicated that one of the fluids is formed into a guided free film and such film is intimately contacted with a second fluid without rupturing the guided free film, and the fluids are thereafter separated. The apparatus employed in carrying out such method comprises a vessel or chamber which includes a plurality of vertical rods or guides suitably spaced from one another for increasing the surface of contact between the fluids. The rods or guides are capable of being wetted by one of the fluids to form a plurality of thin films extending between the rods. It is indicated that the rods or guides may be made of metal, plastics, carbon or ceramic material and are rendered wettable by oil. The rods or guides do not sorb fluids but are merely wetted thereby.

U.S. Pat. No. 2,091,917 to Fenske et al discloses apparatus for the fractionation and/or extraction of mineral oils. The apparatus includes a column, a plurality of attenuated packing members vertically arranged in the column, the packing members being separated from each other. The packing members may comprise lengths of chain.

It has now been found that the efficiency of many of the prior art continuous countercurrent liquid-liquid extraction techniques and apparatus may be increased by employing as the packing material a plurality or bundle of elongated fibrous strands which are capable of sorbing at least one of the solutions to be processed, usually the heavier solution, in capillaries or interstitial spaces of the fibrous strands thereby increasing the contact surface of the solution. This action presents a greater contact surface of the heavier solution to the lighter solution and thereby produces excellent extraction efficiencies.

The terms "sorb", "sorbed", "sorbing" and the like as employed herein refer to the filling of the capillaries of the individual strands of the plurality of elongated fibrous strands comprising the packing material of the invention with solutions by virtue of absorption, adsorption and/or other surface active forces.

DESCRIPTION OF THE INVENTION

In accordance with the present invention, there is provided a process for extracting a component from a first solvent with a second solvent, which second solvent is at least partially immiscible with said first solvent. The process comprises passing one of said first or second solvents through a plurality or bundle of elongated fibrous strands, sorbing said solvent into said fibrous strands so that said solvent fills the capillaries or interstitial spaces in said strands, allowing said solvent to pass into a separation zone, passing the other of said solvents into said separation zone and thence through the annular spaces around the elongated fibrous strands, thereby causing said solvents to contact each other and the extractable component to be removed from said one solvent into the other solvent.

The above-described process is normally a continuous process wherein solvents are continuously passed through the plurality or bundle of fibrous strands. In a preferred embodiment, the solvents are continuously and countercurrently passed through the fibrous strands.

Normally, the solvents employed can be classified as a heavy solvent phase and a light solvent phase and the heavy solvent phase is passed downwardly through the fibrous strands. The light solvent phase is passed up around said fibrous strands in contact with the heavy solvent phase. For example, where the heavy solvent phase comprises an aqueous solution of a component to be extracted, such as caffeine, and the extractant, that is the liquid phase to which the component is to be transferred (the light solvent phase) comprises ethyl acetate, the heavy solvent including the caffeine is passed downwardly through the bundle of elongated fibrous strands so that it substantially saturates and/or and is sorbed into the fibrous strands; the solution actually fills the capillaries or interstitial spaces formed between the individual fibers of the strands. The heavy solvent phase including the component to be extracted moves continually downwardly into a separation zone, usually located at or in close proximity to the bottom end of the bundle of elongated fibrous strands. The light solvent phase is passed into the separation zone and in effect forms a two-phase mixture with the heavy solvent phase, the bottom phase, of course, being the heavy solvent phase and the top phase being the light solvent phase. The light solvent phase is then made to move upwardly under a slight hydrostatic head, thereby effecting countercurrent flow of the light solvent phase through the annular spaces of the elongated fibrous strands and in contact with the heavy solvent phase sorbed in the fibrous strands.

The above-described process for extraction of an extractable component from a solution into a liquid extractant has been found to be substantially more efficient than prior art continuous countercurrent extraction techniques. In fact, prior art continuous countercurrent extractors of simple contruction (which do not include internal mixing mechanisms) have been found to have a rather low efficiency namely, an HETS value (that is height equivalent to the theoretical stage) greater than one foot. Prior art continuous countercurrent extractors provided with internal mixing mechanisms are of reasonably high efficiency, HETS of two to five inches. However, these types of extractors are operated with a continuous solvent phase and a dispersed phase and thus they share a common disadvantage of losing their effectiveness when emulsion occurs. In the extraction technique and extraction apparatus of the invention where both solvent phases flow as continuous streams, a very high efficiency is attained, namely an HETS value as low as 1.1 inch. Furthermore, because of the absence of mechanical mixing between the solvent phases, in the process and apparatus of the invention, there is no danger of the formation of emulsions, as in prior art techniques wherein internal mixing mechanisms are employed.

In an alternate embodiment of the process of the invention, a mixture of two compounds can be separated, one of said compounds being extracted into a light solvent phase and the other of said compounds being extracted into a heavy solvent phase. In this embodiment, the heavy solvent phase actually comprises two phases, namely, a primary heavy phase comprising a heavy solvent which in effect is one extractant and a secondary heavy phase comprising the same heavy solvent having dissolved therein the two compounds to be separated into pure components.

It will be understood that the two components to be separated or extracted ill possess different distribution coefficients for the solvents of the heavy and light phases.

The process of the invention for separating the two compounds comprises passing the primary heavy phase (which initially does not include either of the compounds to be extracted) downwardly through a first set of said plurality or bundle of elongated fibrous strands. Primary heavy phase is thereby sorbed in and on the fibrous strands, as described hereinbefore, and is distributed into a first separation zone, which is located in close proximity to the bottom of a first set of fibrous strands. The secondary heavy phase (which includes the components to be separated) is fed into the first separation zone wherein it is mixed with the primary heavy phase. The mixture of the primary and seondary heavy phases is passed through a second set of elongated fibrous strands and into a second separation zone. Light solvent phase is passed into said second separation zone in contact with the combined heavy phase so as to form a two-phase mixture, the heavy phase being on the bottom. The light solvent phase is then made to move upward under a slight hydrostatic head through the annular spaces of the second set of fibrous strands and into the first separation zone and finally upwardly through the annular spaces of the first set of fibrous strands. As the light solvent phase continually contacts the heavy solvent phase including the primary and secondary portions thereof, one of the components to be separated is extracted into the light solvent phase while the other component to be separated remains in the heavy solvent phase. The two solvent phases, namely, the heavy and the light solvent phases, are thereafter collected, as will be described hereinafter.

The separation of caffeine and nicotinamide is carried out to illustrate the utility of the above process. In such case, the caffeine, which has a higher distribution coefficient (0.76) is completely extracted into the light solvent phase (such as ethyl acetate) which flows out at the top of the first set of fibrous strands (top of the column) while the nicotinamide, which has a smaller distribution coeficient (0.19) is completely extracted into the heavy solvent phase (for example water) which flows out at the bottom end of the second set of fibrous strands (the end of the fibrous strands in close proximity to the second separation zone).

The above process technique thus provides a means for efficient separation of two components with different distribution coefficients from a mixture of these two.

Further, in accordance with the present invention, there is provided apparatus for carrying out the processes as described above. One embodiment of the apparatus of the invention comprises a column, a first set of a plurality or bundle of elongated firbrous strands capable of sorbing a desired solvent (usually a heavy solvent phase), arranged in said column, a first separation zone disposed below said column, means for feeding a first solvent into said column and causing said first solvent to flow through said plurality of elongated fibrous strands in the column into said separation zone, means for feeding a second solvent into said first separation zone and through said annular spaces of said fibrous strands, and means for recovering said first and second solvents.

The means for feeding second solvent is preferably disposed so as to feed said second solvent countercurrently to and in contact with said first solvent as the solvents pass through the plurality of elongated fibrous strands and the annular spaces of the column Normally, the column will be vertically disposed and the means for feeding the first solvent (the heavy solvent phase) is disposed above the plurality of fibrous strands, while the means for feeding the second solvent (the light solvent phase) includes means for introducing the second solvent below the plurality of elongated fibrous strands.

As will be seen hereinafter, the fibrous strands may comprise any natural or synthetic fibers having a plurality of openings or capillaries capable of sorbing a desired solvent, such as the heavy solvent phase. In fact, it is theorized that the apparatus of the invention is able to obtain the high efficiencies as described above because of the use of the fibrous strands which sorb and are not merely wetted by the heavy solvent phase. The fibrous strands, are saturated by the heavy solvent phase and actually break up the heavy solvent phase into a plurality of continuous streams, thereby presenting an exceedingly large surface contact area to the light solvent phase. This is indeed unique and unexpected inasmuch as until now, no such contact material has been employed or suggested.

In an alternative embodiment of the apparatus of the present invention, which apparatus is employed in separating two compounds with different distribution coefficients from a mixture of these compounds and comprises a first column including a first set of a plurality of elongated fibrous strands, and means for feeding a heavy solvent phase into the upper portion of said first column as described above. There is also provided conduit means extending from said first separation zone (described above), a second set of a plurality of elongated fibrous strands carried by said conduit means, said second set having first and second end portions, said first end portion being in communication with said first separation zone, a second separation zone in communication with said second end portion of said second set of plurality of elongated fibrous strands, the means for feeding said second solvent (the light solvent phase) being in communication with said second separation zone, and further including means for feeding a solution of the two extractable components dissolved in the heavy solvent phase into the first separation zone. In addition, the first separation zone includes mixing means for mixing the heavy solvent phase (first solvent) emerging from the first column and the solution of extractable components.

DETAILED DESCRIPTION OF THE FIGURES

Figure 1:
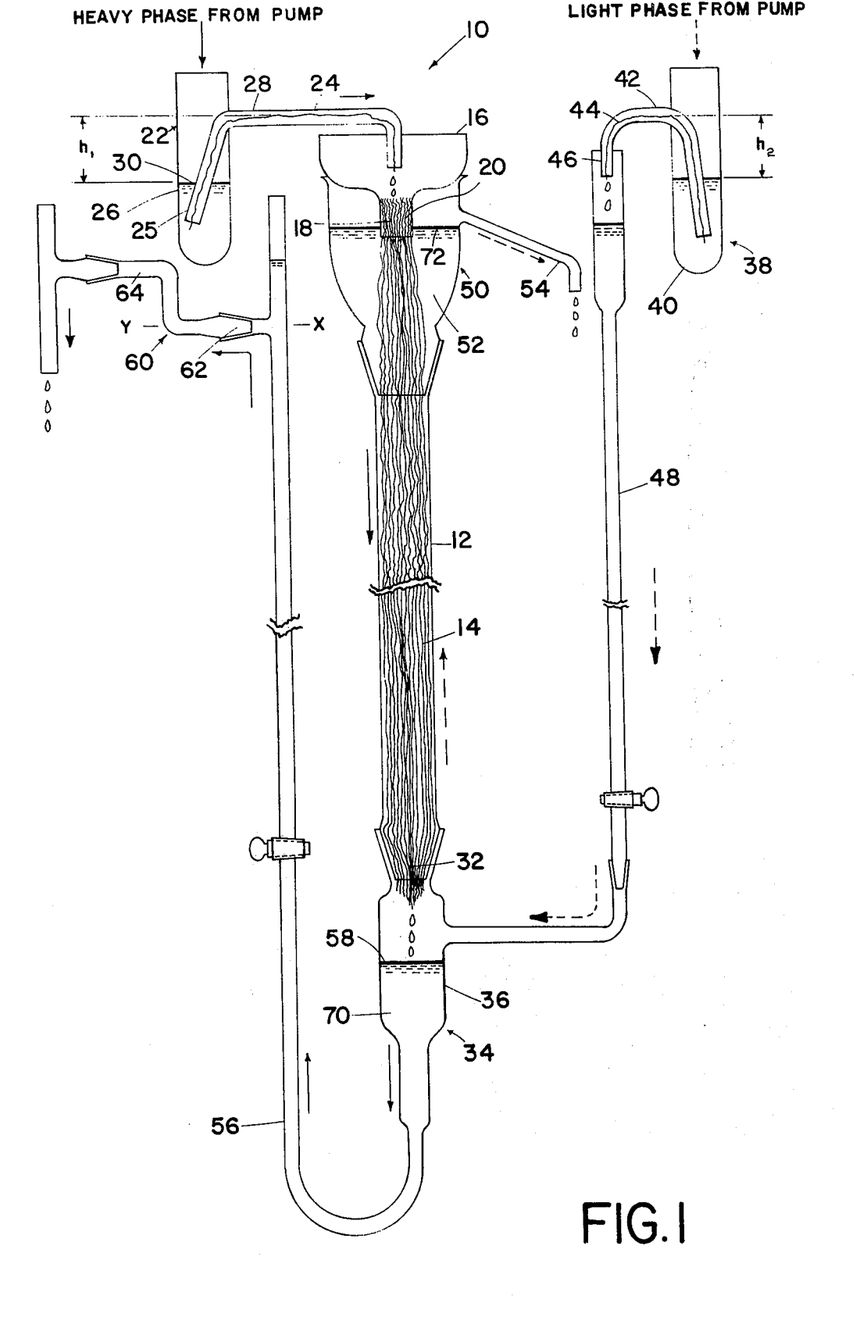
FIG. 1 is a schematic representation of apparatus in accordance with the present invention.
Figure 2:
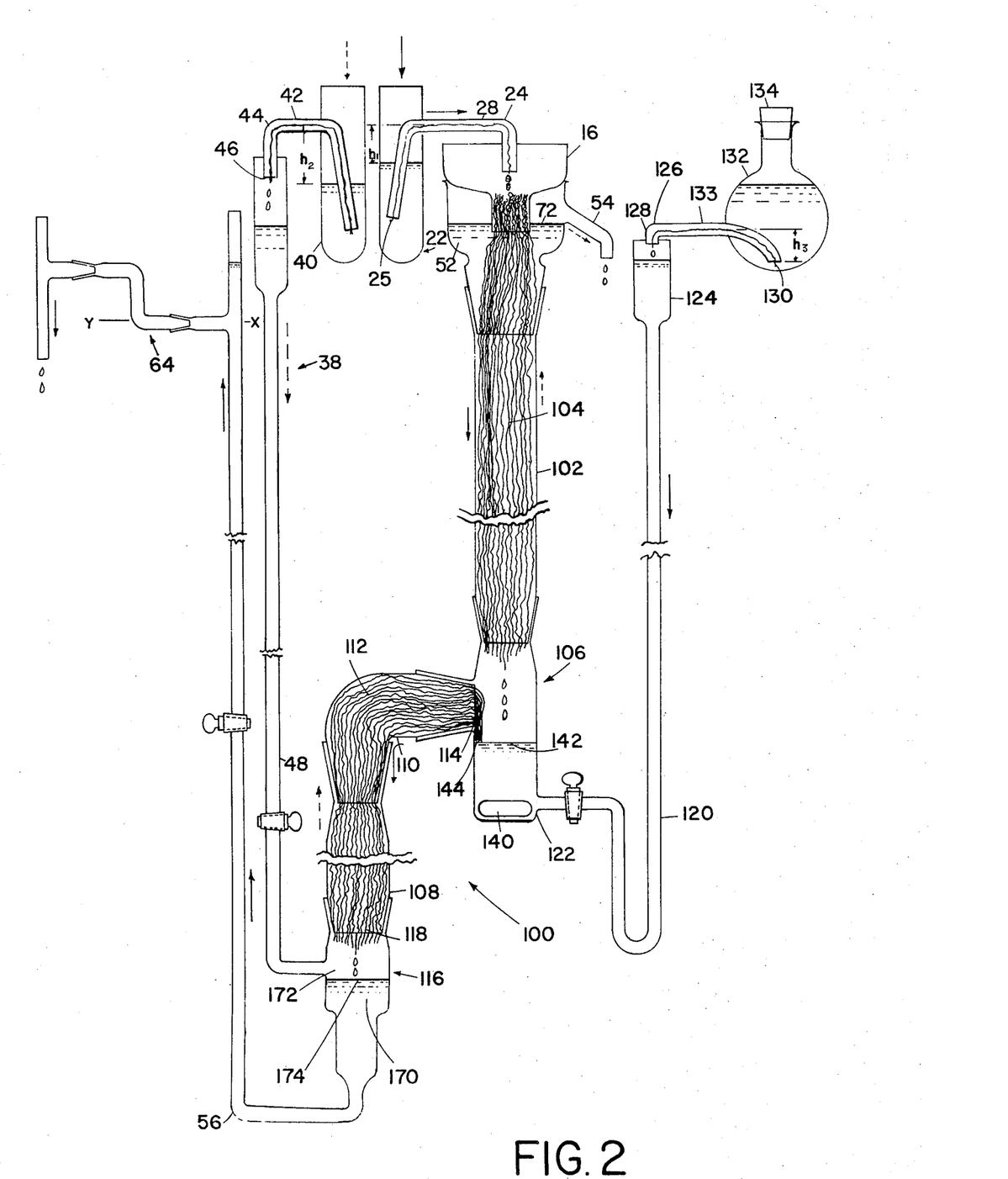
FIG. 2 is a schematic representation of another embodiment of the apparatus of the present invention employed in separating two compounds from each other.

Referring now to the accompanying Figures wherein like numerals represent like parts in the two views, in FIG. 1, there is shown extraction apparatus in accordance with the present invention designated generally by the numeral 10. The extraction apparatus 10 includes a vertically disposed column 12. The column 12 includes a plurality of elongated, loosely packed, fibrous strands, such as strands of yarn, designated generally by the numeral 14. In the embodiments shown, the strands of yarn fitted in the column 12 comprise 9 strands per cm.$^2$ of column cross-sectional area, 18 strands in a column of 15.7 mm. (inside diameter). The strands of yarn may comprise 70% cotton, 30% rayon yarn Woolworth No. 612(diameter when wet equals 3 mm.).

Means for feeding heavy solvent phase into the column 12, is disposed at the top of the column 12 and may comprise a heavy phase distributor or funnel or like member 16, as shown. The upper ends 18 of the strands of yarn 14 are tightly packed into the constricted portion 20 of the distributor 16. In the embodiment shown, the constricted portion 20 may have an inside diameter equal to about 3/5 of the column diameter.

The means for feeding heavy solvent phase comprises a flow rectifier 22 to which a heavy solvent phase is pumped by a metered pump from a reservoir of said solvent (not shown for purposes of clarity). The flow rectifier 22 is designed to convert a pulsating flow of heavy solvent phase pumped from the heavy solvent phase reservoir into a continuous flow. The flow rectifier 22, as shown, includes an inverted U-tube 24 sealed into a tube 26, as shown, The inverted U-tube 24 preferably includes a strand of yarn 25, (such as the cotton rayon yarn, described above) which acts as a wick to continuously transfer heavy solvent phase from the tube 26 to the heavy phase distributor 16, as shown. The flow rate of the heavy solvent phase from the tube 26 through the inverted U-tube and the yarn 25 depends upon the hydrostatic head $h_1$, namely, the difference in height between the horizontal portion 28 of the inverted U-tube 24 and the level 30 of heavy solvent phase in the tube 26. It will be understood that the level of heavy solvent phase in the tube 26 remains substantially constant as long as the pump flow rate of heavy solvent from the reservoir remains constant.

Disposed below the end 32 of the plurality of elongated fibrous strands 14 is a separation zone 34, the purpose of which will be made clear hereinafter. The separation zone 34 may comprise a portion of the column 12 or preferably a separate cylindrical or elongated vessel as shown, generally designated by numeral 36.

Means for feeding second solvent or light solvent phase comprises a flow rectifier generally designated by the numeral 38 and includes a tube 40 to which is sealed an inverted U-tube 42 having a wick 44 therein similar to that described above with respect to the means for feeding heavy solvent phase. The tube 40 is in communication with light solvent phase reservoir (not shown for purposes of drawing clarity) from which light solvent phase is pumped by a metered pump to the tube 40. The means 38 for feeding light solvent phase functions substantially in the same manner as the means for feeding the heavy solvent phase (22) described above.

The end 46 of the inverted U-tube 42 is linked to a conduit 48, which in turn is connected to the separation zone 36, below the end 32 of the plurality of elongated fibrous strands 14, as shown.

The means for collecting and removing light solvent phase is disposed near the top of the column 12 and is generally designated by the numeral 50. Such means 50 may comprise a collection chamber 52 having an outlet tube 54 through which light solvent phase is removed from the chamber 52 and recovered.

The means for removing heavy solvent phase may comprise conduit 56 which is linked to the bottom of the separation zone 36 as shown.

In an optional embodiment of the invention, the level at which the heavy solvent phase exits through the conduit 56 can be lowered or raised so as to thereby control the level of the interface 58 between the light solvent phase and the heavy solvent phase in the separation zone 36. Such level can be controlled by use of a conduit 60, one end 62 of which is linked to the conduit 56. Conduit 60 may take the form of a Z-shaped tube 64. The Z-shaped tube 64 is adapted to rotate about the axis XY to raise or lower the level of the interface 58 as will be described hereinafter.

The flow direction of the heavy solvent through the apparatus shown in FIG. 1 is indicated by the solid arrows, whereas the flow direction of the light solvent phase through the apparatus of FIG. 1 is indicated by the broken arrows.

The process of the invention employing the apparatus in FIG. 1, can be carried out as follows.

It is assumed for illustrative purposes that the first solvent or heavy solvent phase comprises water and the second solvent or light solvent phase comprises ethyl acetate. The water contains caffeine dissolved therein which is, by means of the apparatus or process of the invention, transferred to the ethyl acetate.

The apparatus 10 of the invention is started by first filling the column 12 with pure heavy solvent phase, that is pure water saturated with ethyl acetate with no caffeine. The water is then drained. This initial operation is to insure that the strands of yarn or fibrous material 14 are saturated with the heavy solvent phase (water) which fills the capillaries or interstitial spaces in the individual fibers forming the strands.

Thereafter, the column (i.e. the annular spaces) is filled manually with the light solvent through the inlet tube 48 until the light solvent emerges from exit 54. Thereafter, both solvent phases are then pumped from their respective reservoirs, for example, by a Buchler micropump pre-adjusted to desired pumping rate, into the flow rectifiers 22 and 38 respectively. The micropump is preferably set at 2 cycles per minute. The heavy solvent phase (water) moves through the inverted U-tube 28, by wicking, and thereafter through the heavy solvent phase distributor 16 into the bundle of elongated fibrous strands 14. The heavy solvent phase (water) distributes itself to each of the fibrous strands (as described above) and flows from the strands into the separation zone 36. The lighter phase in column 12 is then made to move upward by continuously admitting the ethyl acetate (pre-saturated with water) into the separation zone 36 through the conduit 48. Heavy solvent phase and light solvent phase collect in the separation zone to form a two phase mixture, the bottom portion of which is designated by the numeral 70 and comprises heavy solvent phase and the upper portion of which is designated by the numeral 72 and comprises light solvent phase.

The light solvent phase moving upward from the interface 58 under a slight hydrostatic head into the column 12 is in contact with the heavy solvent phase moving downwardly through the plurality of elongated fibrous strands 14 saturated with heavy solvent phase containing the component to be separated, namely, caffeine. Thus, countercurrent flow of the heavy and light solvent phases is effected. The heavy solvent phase after moving down through the fibrous strands 14 (which actually function as wall-less tubings) collects on the bottom of the separation zone 36 and flows under the hydrostatic pressure of the light solvent phase in the column 12 through the exit conduit 56 and out the Z-shaped tube 64. As indicated above, by turning the Z-shaped tube around XY as an axis, the level at which the heavy solvent phase exits can be lowered or raised. Meanwhile, the light solvent phase continually moves up through the annular spaces in the column 12 in contact with the heavy solvent phase containing the caffeine and thence into the light solvent phase collector or chamber 52. When the amount of light solvent phase exceeds the level 72, the overflow flows out of the exit conduit 54 and is collected.

The light solvent phase (ethyl acetate) collected from the overflow tube 54 will contain caffeine while the heavy solvent phase collected from the Z-tube 64 (or other collection means) will contain substantially no caffeine.

In operating the apparatus shown in FIG. 1, it is preferred that the interface 58 of light solvent phase and heavy solvent phase collected in the separation zone appear substantially in the middle of the separation zone and of course below the point where light solvent phase is fed into the separation zone. This can be controlled by adjusting the position of the Z-tube 64 as described above.

The interface 58 may fluctuate slightly during a run. If the interface drops too far the light solvent phase can flow out the heavy solvent phase exit, thus nullifying the function of the extraction apparatus of the invention. This problem can be corrected by raising the Z-tube 64 (turning around XY). If the interface 58 rises too far, the light solvent phase will bubble through the heavy solvent phase in the separation zone 36. This is undersirable, because mechanical mixing of the two solvent phases takes place. This can be corrected by lowering the level of the Z-tube 64. After the apparatus is adjusted as indicated above so that the interface 58 is substantially disposed in the middle of the separation zone 36, the extraction apparatus can be run substantially unattended for example, for one week or more, continuously, without any adjustment.

Another embodiment of the apparatus of the invention for use in separating two compounds having different distribution coefficients is shown in FIG. 2 and is generally designated by the numeral 100. The apparatus 100 is essentially a center-feeding extractor wherein a "feed stage" is introduced to the middle of the extraction apparatus as described below.

The apparatus 100 comprises a first or upper column 102 (similar to column 12 in FIG. 1) containing a plurality of loosely packed fibrous strands 104 (as described hereinbefore with respect to FIG. 1). The bottom portion of the column 102 comprises a first separation zone 106, as shown. The first separation zone is also referred to as a feed stage. A second or lower column 108 is connected to the first separation zone 106 by means of a side arm or conduit 110. A second set of a plurality of elongated fibrous strands referred to generally by the numeral 112 is disposed in the lower column 108 and side arm 110 so that the first end 114 of said second set of plurality of fibrous strands 112 is tightly pressed against one side of the first separation zone 106, as shown, such as by means of a polyethylene ring (not shown for purposes of clarity), which tightly fits the first separation zone 106.

A second separation zone generally designated by the numeral 116 is positioned below the lower column 108, that is below the bottom or lower end 118 of the second set of plurality of fibrous strands 112, as shown.

Means for feeding heavy solvent phase into the upper or first column 102 is generally designated by the numeral 22 and may be the same means employed for feeding heavy solvent phase into the apparatus shown in FIG. 1.

Means for feeding light solvent phase into the second separation zone 116 as shown, comprises means generally designated by the numeral 38, which may be the same means employed for feeding light solvent phase into the separation zone shown in FIG. 1.

The means for recovering heavy solvent phase from the second separation zone 116 may be the same means as employed in FIG. 1 in removing heavy solvent phase from the separation zone shown in that apparatus.

Means for feeding the compounds or components to be separated may comprise any conventional means for introducing a mixture of such components into the bottom portion of the first separation zone 106 as shown. An example of such means, as shown, may include a U-shaped conduit 120 linked to the bottom 122 of the first separation zone 106. The upper end 124 of conduit 120 is linked to arc-shaped tube 126 which includes a wick 128 which may be comprised of cotton-rayon thread as described above. The end 130 of the arc-shaped tube is in communication with feed reservoir 132, which actually comprises a flask which is tightly stoppered with a polyethylene stopper 134. As feed solution of components to be separated flows out through the wick 128 in the arc-shaped tube 126, air bubbles flow into the flask through the same arc-shaped tube and rise into the air space above the liquid level in the flask or feed reservoir 132. The rate of flow of the feed solution is governed by the height $h_3$ of the horizontal portion 133 of the tube 126 above the end 130 of said tube 126. As will be apparent, the rate of flow can be adjusted by adjusting the degree of inclination of the feed reservoir or flask 132.

The apparatus shown in FIG. 2 and described above can be employed to separate two compounds having different distribution coefficients in the solvents employed in the separation. For example, the apparatus shown above can be employed in separating caffeine from nicotinamide as described below.

The feed reservoir is supplied with a solution of heavy solvent phase, such as water having dissolved therein caffeine and nicotinamide, that is the compounds to be separated.

The apparatus 100 is first filled up with the heavy phase (ethyl acetate saturated water) and the water is then drained. The column (i.e. the annular spaces) is filled manually with the light phase (water-saturated ethyl acetate) until it overflows from exit 54. Thereafter, both the heavy and light solvent phases are pumped from their respective reservoirs into the system as described above. Feed solution comprised of an aqueous solution of caffeine and nicotinamide is fed from feed reservoir 132 through wick 128 into conduit 120 and first separation zone 106.

As the heavy solvent phase (water) coming from the upper column 102 drops into the first separation zone 106, that is at the bottom of the feed stage, it is mixed with a feed solution, by magnetic stirrer 140 which slowly rotates by conventional means (not shown for purposes of clarity). The second set of plurality of fibrous strands or yarn 112 disposed in the side arm 110 acts as a wick to transfer the heavy solvent phase (water) to the lower column 108, similar to the transfer taking place in the flow rectifiers 22 and 38. Light solvent phase collects in the second separation zone 116 to form a two phase mixture, the bottom portion of which is designated by the numeral 170 and comprises heavy solvent phase and the upper portion of which is designated by the numeral 172 and comprises light solvent phase.

The light solvent phase is made to move upward from the interface 174 under a slight hydrostatic head into the lower column 108 in contact with the heavy solvent phase moving downwardly through the plurality of elongated fibrous strands 118 saturated with heavy solvent phase and thence into the first separation zone 106 up through the upper column 102. Thus, countercurrent flow of the heavy and light solvent phases is effected. The heavy solvent phase after moving down through the lower column 108 collects on the bottom of the second separation zone 116 and flows under the hydrostatic pressure of the light solvent phase in the columns 108 and 102 through the exit conduit 56 and out the Z-shaped tube 64. As indicated above, by turning the Z-shaped tube 64 around XY as an axis, the level at which the heavy solvent phase exits can be lowered or raised. Meanwhile, the light solvent phase continually moves up through the upper column 102 in contact with the heavy solvent phase and thence into the light solvent phase collector or chamber 52. When the amount of light solvent phase exceeds the level 72, the overflow flows out of the exit conduit 54 and is collected.

The light solvent phase (ethyl acetate) collected from the overflow tube 54 will contain caffeine and substantially no nicotinamide while the heavy solvent phase collected from the Z-tube 64 (to other collection means) will contain nicotinamide and substantially no caffeine.

In essence, the entire apparatus functions as a single column with the feed stage situated in the middle, as shown in FIG. 1.

The fibrous strands employed to form the packing material of the apparatus in the present invention can take the form of individual fibers, or a bundle or yarns of such fibers. Examples of such fibrous material suitable for use herein include any natural or synthetic fibrous material such as cotton, rayon, cotton-rayon mixtures, wool, nylon, glass wool, hemp, asbestos, acrylics, polyesters or any other capillary conduits. It will be understood that so-called hollow fibers can also be employed as separate fibers or in the form of a bundle.

The fibrous strands or yarns formed of a plurality of individual fibers, may have an average outside diameter ranging from about 0.5 to about 6mm and preferably from about 1mm to about 4mm and should be employed in an amount from about 6 to about 50 yarns per $cm^2$ of cross-sectional area of the columns employed. In a preferred embodiment, 9 to 12 yarns/$cm^2$ are employed, the yarns having an average diameter of about 3mm, or 40 to 50 yarns/$cm^2$ are employed, the yarns having an average diameter of about 1.5mm. It will be appreciated that increased contact area is obtained, and therefore increased efficiency where the thickness of the strands is reduced and the number of such strands employed is increased.

Where individual fibers are employed, such as the so-called hollow fibers, such fibers can have a diameter ranging from 0.1 to 0.5mm.

The process of the invention including the alternatives as described above may be carried out at room temperature and thus requires no energy or driving forces outside of those generated by the materials and apparatus employed. However, it will be apparent to those skilled in the art, that the extraction techniques of the invention as well as the apparatus employed in conjunction therewith may include heating means, cooling means, means for applying pressure, and the like, depending upon the particular extraction required.

Generally, hydrophilic solvents can be employed as the heavy solvent phase and lipophilic solvents can be employed as the light solvent phase. Examples of these various solvents include hydrophilic solvents such as water, aqueous alkanols (e.g. aqueous methanol), aqueous glycols (e.g. aqueous ethylene glycol), aqueous solutions of salts, or polymers (e.g. dextran) etc., and lipophilic solvents such as aliphatic hydrocarbons (hexanes, heptanes etc.), aromatic hydrocarbons (e.g. benzene, toluene etc.), esters (e.g. ethyl acetate), ketones (e.g. methyl isobutyl ketones), alkanols (e.g.

n-butanol), solutions of polymers or liquid ion-exchange resins in any of these lipophilic or other solvents partially or totally immiscible with a suitable hydrophilic solvent. Of course, the actual solvents employed will depend upon the components to be extracted and especially upon the distribution coefficients of such components relative to the solutions or solvent employed.

The process and apparatus of the invention can be employed in many different types of extractions, such as the extraction of caffeine from water employing ethyl acetate, the separation of caffeine and nicotinamide, employing water and ethyl acetate, and extraction of lipids, steroids, alkaloids, antibiotics, vitamins, pigments, etc. from their natural sources or separation of mixtures of these compounds. Examples of such extractions or separations include extraction of penicillins from fermentation broth (water) with amyl acetate; extraction of steroids from fermentation broth (water) with ethyl acetate or methyl isobutyl ketone, in the microbiological transformation of steroids; in the microbiological conversion of cortexolone (compound S) to 11α-hydroxy-cortexolone (epicompound F), a mixture of these materials can be separated into pure components by using a solvent system of benzene (light phase) and 1:1 methanol-water (heavy phase); a mixture of penicillin G and penicillin V can be separated with a solvent system of n-amyl alcohol (light phase): pH 6.7 McIlvaine's buffer in water (heavy phase); α and β carotenes (Vitamin A precursors) can be separated with the solvent system of n-hexane (light phase): aqueous methanol (heavy phase); o- and m-cresol can be separated in the solvent system of Skellysolve (which is essentially n-hexane): aqueous methanol; and isomers of prostaglandin can be separated employing a solvent system of aqueous methanol (heavy phase) and n-hexane (light phase).

The variables referred to above can be ascertained by standard engineering calculations by one skilled in the art taking into account the distribution coefficient of the components, the flow rates of the various solvents, the number of theoretical stages required, the design of the particular extraction apparatus employed and the like.

Although the process and apparatus of the invention is described in conjunction with essentially laboratory apparatus, the components of which are generally made of glassware, it will be appreciated that conventional pieces of industrial equipment can be employed to replace the rather simple pieces of equipment shown in the Figures. Furthermore, it will be appreciated that although the apparatus and proces described above are essentially described as a one stage procedure, two or more stages can be employed depending upon the extraction requirements such stages having a design function similar to that shown in the apparatus illustrated in the Figures.

It is noteworthy that in carrying out the process of the invention employing the apparatus as described herein, substantially all of the energy is generated in the system, with no external source of energy necessary except for any pumps or mixing apparatus employed. Thus, the process is carried out with substantially no effect on the environment and thus itself does not add to environmental pollution.

The following Examples further illustrate and represent preferred embodiments of the present invention.

THE FOLLOWING TERMS ARE EMPLOYED IN THE WORKING EXAMPLES $D$ = distribution coefficient = $\dfrac{\text{Concentration in light phase at equilibrium}}{\text{Concentration in heavy phase at equilibrium}}$ $H$ = flow rate of heavy phase, in ml/hr
$L$ = flow rate of light phase, in ml/hr
$R_v$ = relative flow rates = L/H
$E$ = extraction factor = $DR_v$
$m$ = feed stage number counting from bottom of column
$n$ = feed stage number counting from top of column, or total number of theoretical stages in a column with end feeding $R$ = rejection ratio = $\dfrac{\text{Quantity in light phase effluent}}{\text{Quantity in heavy phase effluent}}$ $R'$ = retention ratio = $\dfrac{\text{Quantity in heavy phase effluent}}{\text{Quantity in light phase effluent}}$ $x$ = concentration of solute in heavy solvent phase, in mg/ml
$y$ = concentration of solute in light solvent phase, in mg/ml
$x_n$ or $Y_n$ = concentration of solute in the feed solutions entering the column or in the extract leaving the column with end feeding, in mg/ml
$x_o$ or $Y_o$ = concentration of solute in the raffinate solutions leaving the column with end feeding, in mg/ml
$x_p$ or $Y_p$ = concentration of solute in the solute rich extracts leaving the column with center feeding, in mg/ml
$x_B$ or $Y_B$ = concentration of solute in the solute poor effluents leaving the column with center feeding, in mg/ml
$Z$ = effective column height, in inches
H.E.T.S. = height equivalent of a theoretical stage, in inches
$\beta$ = relative distribution = $D_1/D_2$ (subscript 1 referring to solute more soluble in light phase and subscript 2 referring to solute more soluble in heavy phase)
$d$ = diameter of column, in mm
$A$ = cross-sectional area of column, in cm²

EXAMPLE 1

Extraction of Caffeine from Water with Ethyl Acetate in Extractors of Different Heights To illustrate the efficient operation of the extraction apparatus shown in FIG. 1, employing cotton-rayon fibrous strands, the model system: caffeine-water-ethyl acetate is tested. The distribution coefficient (D) of caffeine between ethyl acetate and water is first determined by direct partitioning in a separatory funnel and measuring the absorbance of both solvent phases at 272 nm in a Beckmann Model DU spectrophotometer. It is shown to be a constant up to a concentration of ca. 2 mg per ml in the agueous phase (heavy solvent phase) and is equal to 0.76 at 23° C. A solution of 2 mg of caffeine per ml of ethyl acetate-saturated water is used as the heavy solvent phase and is admitted to the top of the extractor 10 (FIG. 1) as described hereinbefore. Solute-free pure ethyl acetate which has been saturated with water is used as the light solvent phase and is admitted to the light phase inlet (see FIG. 1) as described above. A metered pump (Buchler micropump, 2 cycles per min.) is set at proper rates for the two solvent phases so that the resulting extraction factor (E) is slightly greater than 1.0 (see Table 1). Such a condition is essential for a reliable evaluation of the extraction efficiency. The test is run for 2 – 4 days. Effluents of both phases are collected. Samples are taken at 8 or 16 hour intervals and analyzed for their caffeine contents by measuring the absorbance at 272 nm in a Beckmann Model DU spectrophotometer. The caffeine concentration in the heavy phase effluent ($x_o$) is shown to rise from zero to a plateaued value equal to a small fraction of that in the heavy phase entering the extractor at its top ($x_n$) in 12–48 hours, depending upon the height of the extractor. Over 95% of the caffeine admitted to the extractor is found in the light phase effluent. From the values for E and $x_n/x_o$, one can calculate the efficiency of the extractor in terms of the number of theoretical stages ($n$) by the following equation $$\frac{x_n}{x_o} = \frac{E^{n+1}-1}{E-1} \text{ or } n = \frac{\text{Log}\left[\frac{x_n}{x_o}(E-1)+1\right]}{\text{Log } E} - 1 \quad (1)$$

From the effective height of the column (Z), one can calculate the height equivalent of a theoretical stage (H.E.T.S.)

$$\text{H.E.T.S.} = Z/n \qquad 2.$$

The data from test runs with different effective heights are tabulated in Table I.

It can be seen that the H.E.T.S. values can be as low as 1.10 in. Although this value increases somewhat with increase in the column height (Z), an increase in Z does still increase the number of theoretical stages ($n$) considerably. In other words, the longer the column, the greater the efficiency of the extraction.

It is to be pointed out that the use of the extractor in such a manner involves a great saving in the quantity of solvent to be used and the labor required. For example, with the 19.0 inch column, 1.56 volume of ethyl acetate per volume of water leaves 1.6% ((1/62.5) × 100) of the caffeine in the raffinate. If one uses a mixer-settler type of extractor, it would require six times of extraction to achieve the same recovery of caffeine. This means the use of 9.4 volumes of ethyl acetate per volume of water and the corresponding increase in the labor required.

Table I*

| Z in. | H ml/hr | L ml/hr | $R_v$ (L/H) | E $(DR_v)$** | $x_n$ mg/ml | $x_o$ mg/ml | $x_n/x_o$ | n | H.E.T.S. Z/n in | $Y_n$ mg/ml | Material Balance % | Duration of Experiment hr |
|---|---|---|---|---|---|---|---|---|---|---|---|---|
| 8.2 | 18.3 | 26.2 | 1.43 | 1.09 | 1.92 | 0.161 | 11.9 | 7.5 | 1.09 | 1.17 | 95.5 | 28.2 |
| 19.0 | 18.9 | 29.5 | 1.56 | 1.18 | 2.02 | 0.0323 | 62.5 | 14.1 | 1.35 | 1.29 | 101.0 | 96.8 |
| 27.0 | 18.0 | 28.0 | 1.56 | 1.18 | 1.95 | 0.0140 | 139.0 | 18.7 | 1.44 | 1.17 | 94.3 | 65.7 |
| 36.5 | 18.1 | 28.1 | 1.55 | 1.18 | 1.95 | 0.0093 | 210.0 | 21.4 | 1.70 | 1.22 | 97.4 | 74.8 |

*All columns have inside diameter of 15.7 mm and 18 yarn strands are used.
**As stated, D = 0.76 is used in all the calculations.

EXAMPLE 2

Extraction of Caffeine from Water with Ethyl Acetate in Extractors of Different Diameters The test runs described in Example 1 are repeated with columns of 10.7 mm, 15.7 mm and 25.0 mm in inside diameter. The number of yarn strands used and the rates of flow of both solvent phases per cm² of cross-sectional area are kept approximately the same in all three cases. From the data given in Table II, it can be seen that an increase in diameter, i.e., cross-sectional area did cause an increase in the H.E.T.S. value, i.e., a decrease in the extraction efficiency, but an increase of 5.5 (4.91/0.902) times in cross-sectional area entails only a 70% (2.28/1.35 = 1.69) increase in the H.E.T.S. value. This result indicates that the extractor can be scaled up without excessive loss of its efficiency.

Table II

| d mm | A cm² | No. of Yarn Strands | Z in | H ml/hr | H/A (ml/cm²)/hr | L ml/hr | L/A (ml/cm²)/(L/H) | $R_v$ | E $(DR_v)^1$ | $x_n/x_o$ | n | H.E.T.S. (Z/n) in | Duration of Experiment hr |
|---|---|---|---|---|---|---|---|---|---|---|---|---|---|
| 10.7 | 0.902 | 9 | 16.2 | 9.7 | 10.7 | 13.5 | 15.0 | 1.39 | 1.06 | 17.5 | 11.5 | 1.41 | 43 |
| 15.7 | 1.93 | 18 | 18.0 | 18.0 | 9.33 | 27.4 | 14.2 | 1.52 | 1.16 | 34.5 | 11.7 | 1.54 | 62 |
| 25.0 | 4.91 | 46 | 27.0 | 44.5 | 9.07 | 72.0 | 14.7 | 1.62 | 1.23 | 56.5 | 11.8 | 2.28 | 96 |

¹D = 0.76,

EXAMPLE 3

Extraction of Caffeine from Ethyl Acetate with Water

Caffeine is dissolved in water-saturated ethyl acetate at a concentration of 1.2 mg/ml ($Y_n$) and this solution is admitted to the extractor (shown in FIG. 1) as the light phase at a rate of 19.3 ml/hr. Solute-free pure ethyl acetate saturated-water is used as the heavy phase at a rate of 17.3 ml/hr in a column of 15.7 mm in inside diameter with an effective height of 19.0 in. The test is run for 48 hours. The caffeine concentration in the light phase effluent ($Y_o$) is found to reach a plateau of 0.0114 mg/ml ($Y_o$) in ca. 30 hours, as expected. By using $Y_n/Y_o$ (105) and 1/E (1.180) in place of $x_n/x_o$ and E respectively, in Equation (1) the $n$ and H.E.T.S. values for this example are calculated to equal to 17.0 and 1.12 in respectively.

It can be seen that the efficiency of this experiment (H.E.T.S. = 1.12 in) is somewhat higher than that given in Example 1 (H.E.T.S. = 1.35 in). This difference is, however, by no means of much significance. It is, therefore, concluded that caffeine can be extracted from either solvent phase to the other with approximately the same efficiency.

EXAMPLE 4

Separation of Caffeine and Nicotinamide by Continuous Countercurrent Extraction

To illustrate that the continuous countercurrent extractor with center-feeding (shown in FIG. 2) can be used to separate two compounds from their mixture, caffeine and nicotinamide in the solvent system of ethyl acetate and water are chosen. The distribution coefficient of nicotinamide ($D_2$) is determined to be 0.19, that of caffeine ($D_1$) is determined to be 0.19, that of caffeine ($D_1$) is 0.76. The $\beta$ value is, therefore, equal to $0.76/0.19 = 4.0$.

To determine how quantitatively these two compounds can be separated, a solution of caffeine in the heavy phase (ethyl acetate-saturated water) at a concentration of 12 mg/ml is first fed into the extractor shown in FIG. 2 with a feed stage in the middle as described above, at a rate of 1.5 ml per hr. The extractor is of 15.7 mm (inside diameter) and of effective heights of 19.0 inch below and 19.0 inch above the feed stage. Solute-free pure water-saturated ethyl acetate is admitted to the extractor as the light phase at a flow rate of 46.0 ml per hr. and solute-free pure ethyl acetate-saturated water at a flow rate of 17.5 ml per hr is the heavy phase. The $R_v$ value below the feed stage is $46.0/19.0 = 2.42$ and that above the feed stage is $46.0/17.5 = 2.63$. The example is run for 6 days. The $x_B$ and $y_P$ values are determined every 24 hours. They are, on the average after the first 24 hours, 0.0002 mg/ml and 0.39 mg/ml respectively. The rejection ratio (R) is calculated to be $2.42 \times 0.39/0.0002 = 4,800$. By using the method given by Bartels and Kleinman, Chemical Engineering Progress 45 (1949) p. 344–345, the rejection ratio can be calculated on the basis that $n=m=14$, i.e., 14 theoretical stages above and below the feed stage (see Example 1). The value is 5,700, agreeing well with that determined in the present Example, in view of the low accuracy of the $x_B$ value. In essence, this value means that the heavy phase effluent is virtually free of caffeine.

The same test run is repeated with a solution of nicotinamide in the heavy phase at a concentration of 12 mg/ml as the feed. The experiment is run for 6 days and the nicotinamide concentrations in the heavy and light phase effluents are determined by measuring the absorbance at 264 nm in a Beckmann Model DU spectrophotometer every 24 hours. After 24 hours, the the average $x_p$ value is found to be 0.95 mg/ml and the average $y_B$ value is found to be <0.0001 mg/ml giving a retention ratio (R') $> 0.95/(0.0001 \times 2.42)$, i.e. $> 4,000$. The R' value calculated on the basis: $m=n=14$, is equal to 19,000. In essence, this value means that the light phase effluent is free of nicotinamide.

After establishing that the extractor with center feeding does work as expected, the same test run is repeated this time with a mixture of caffeine and nicotinamide dissolved in the heavy phase at a concentration of 12 mg of each compound per ml as the feed. The test is run for 5 days. After 24 hours, the heavy and light phase effluents are tested on a thin-layer chromatogram. A mixture of ethyl acetate, methanol and water (50:5:1) is used to develop the chromatogram on a Brinkmann silica gel F-254 plate. Only a single caffeine spot is found in the light phase effluent ($R_f$=0.58) and only a nicotinamide spot is found in the heavy phase effluent ($R_f$=0.50). The uv-spectra of these two effluents are also determined in a Perkin-Elmer Model 402 sectrophotometer. The light phase effluent shows a spectrum identical with that of pure caffeine with $\lambda$max at 273 nm and that of the heavy phase identical with that of pure nicotinamide with $\lambda$max at 257 nm (sh), 264 nm, and 271 nm (sh). These data fully demonstrate that the continuous countercurrent extractor (shown in FIG. 2) when operated with center feeding satisfactorily separates two compounds of different distribution coefficients from their mixture.

EXAMPLE 5

Extraction in the Presence of Emulsifying Agent

When a solution of Tween 80 in water at a concentration of 1 mg/ml is layered with ethyl acetate in a test tube and the latter is inverted 30 times, an emulsion is formed. This emulsion remains unchanged on standing for at least 24 hours. On centrifuging, the emulsion disappears to give a clear ethyl acetate phase and an aqueous phase which appears slightly milky. To demonstrate that no such emulsion will be formed in using the extractor of FIG. 2, the experiment described in Example 4 is repeated with a solution of Tween 80 in the heavy phase at a concentration of 15 mg/ml as the feed. The extractor runs just as if no Tween 80 is introduced. The light phase effluent is clear while the heavy phase appears slightly milky just as the heavy phase appears after breaking the emulsion by centrifuging the test tube. The milky appearance disappears after standing for one hour. This extractor will, therefore, function normally even if any emulsifying agent is introduced.

EXAMPLE 6

A Colorful Demonstration of the Continuous Countercurrent Extraction Process

As a colorful demonstration of the function of the extractor, of FIG. 2, an experiment is run in which two dyes, Sudan black B (purple) and p-phenylazophenol (yellow), are separated by the use of the present apparatus. The heavy solvent is 80% (by vol.) methanol (20% water) and light solvent is a 1:3 (by vol.) mixture of toluene and n-hexane. The distribution coefficient of Sudan black B ($D_1$) is ca. 2.0 and that of p-phenylazophenol ($D_2$) is ca. 0.50, giving a $\beta$ value of ca. 4.0.

The extractor as described in Example 4 is run with these two solvent phases each at 20.0 ml per hour. A solution of these two dyes in the heavy phase at concentrations of 0.5 mg of Sudan black B per ml and 10 mg of p-phenylazophenol per ml is fed to the feed stage at a rate of 2.0 ml/hr. This mixture appears dark green. This experiment is run for 7 days. After the first 24 hours, one sees that the heavy phase effluent is bright yellow, no different from a solution of 1 mg of pure p-phenylazophenol per ml of the heavy phase and that the light phase effluent appears purple just as a solution 0.05 mg of pure Sudan black B per ml of the light phase. It is also interesting to observe the color change along the column. From the feed stage on down, the mixture color gradually gives way to pure yellow, and for 3-4 inches just above the separator, the color is completely yellow. The same situation must also exist — mixture color gives way to pure purple — above the feed stage. But the purple masks up the mixture color and this gradual change does not appear as obviously as that taking place below the feed stage. However, for approximately 2 inches above the feed stage the presence of the mixture color is readily visible.

What is claimed is:

1. Apparatus for use in carrying out liquid-liquid extractions, comprising a column defining an elongated contacting area, a first set of a plurality of elongated loosely packed fibrous strands of yarn comprising natural or synthetic fibers capable of sorbing a solvent and containing a plurality of capillaries or interstitial spaces capable of sorbing a solvent, longitudinally arranged in said column, a first separation zone, means for feeding a first solvent, including a component to be extracted, into said column and causing first solvent to flow through said column through said plurality of elongated fibrous strands a portion of which is sorbed in said capillaries or interstitial spaces, and the remainder of which flows into said separation zone, means for feeding a second solvent which is at least partially immiscible with said first solvent into said separation zone and through annular spaces of said plurality of elongated fibrous strands, thereby causing said solvents to contact each other and the extractable components to be removed from the first solvent into the second solvent, and means for recovering said first and second solvents.

2. The apparatus as defined in claim 1 wherein said means for feeding a second solvent is disposed so as to feed said second solvent countercurrently to and in contact with said first solvent as said solvents pass through and around said plurality of elongated fibrous strands.

3. The apparatus as defined in claim 2 wherein said column is vertically disposed and said means for feeding said first solvent is disposed above said plurality of fibrous strands.

4. The apparatus as defined in claim 3, wherein said means for feeding second solvent includes means for introducing said second solvent below said plurality of elongated fibrous strands.

5. The apparatus as defined in claim 1 including in addition conduit means extending into said first separation zone a second set of a plurality of elongated fibrous strands carried by said conduit means having first and second end portions, said first end portion being in communication with said first separation zone, a second separation zone in communication with said second end portion of said second set of plurality of elongated fibrous strands, said means for feeding said second solvent being in communication with said second separation zone, and further including means for feeding a mixture of first solvent which contains at least two extractable components to be separated into said first and second solvents, into said first separation zone.

6. The apparatus as defined in claim 1 wherein said strands of said plurality of elongated fibrous strands have an average outside diameter of from about 0.5 to about 6mm.

7. The apparatus as defined in claim 6 wherein said fibrous strands are employed in an amount of from about 6 to about 50 strands per $cm^2$ of cross-sectional area of the column.

* * * * *

UNITED STATES PATENT AND TRADEMARK OFFICE
CERTIFICATE OF CORRECTION

PATENT NO. : 3,989,466
DATED : November 2, 1976
INVENTOR(S) : Samuel C. Pan

It is certified that error appears in the above–identified patent and that said Letters Patent are hereby corrected as shown below:

Column 3, line 46, "ill" should read --will--.
Column 12, line 12, "proces" should read --process--.
Column 13, Table II, the heading of columns 8 and 9 respectively should read -- $\frac{L/A_2}{(ml/cm^2)/hr}$ -- and -- $\frac{R_y}{(L/H)}$ --.
Column 15, line 22, delete "is determined to be 0.19, that of caf-".
Column 15, line 23, delete "feine $(D_1)$".

Signed and Sealed this

Twenty-second Day of February 1977

[SEAL]

Attest:

RUTH C. MASON
*Attesting Officer*

C. MARSHALL DANN
*Commissioner of Patents and Trademarks*